(12) United States Patent
Koch et al.

(10) Patent No.: US 9,546,282 B2
(45) Date of Patent: Jan. 17, 2017

(54) ELECTRONICALLY CONDUCTIVE ENAMEL COMPOSITION

(71) Applicant: DBFZ Deutsches Biomasseforschungszentrum Gemeinnuetzige GmbH, Leipzig (DE)

(72) Inventors: Christian Koch, Dessau-Roβlau (DE); Martin Droessiger, Leipzig (DE)

(73) Assignee: DBFZ DEUTSCHES BIOMASSEFORSCHUNGSZENTRUM GEMEINNUETZIGE GMBH, Leipzig (DE)

(*) Notice: Subject to any disclaimer, the term of this patent is extended or adjusted under 35 U.S.C. 154(b) by 40 days.

(21) Appl. No.: 14/363,581

(22) PCT Filed: Dec. 6, 2012

(86) PCT No.: PCT/EP2012/074615
§ 371 (c)(1),
(2) Date: Jun. 6, 2014

(87) PCT Pub. No.: WO2016/083680
PCT Pub. Date: Jun. 13, 2013

(65) Prior Publication Data
US 2014/0370261 A1    Dec. 18, 2014

(30) Foreign Application Priority Data

Dec. 6, 2011  (DE) .................. 10 2011 087 818
Jun. 1, 2012  (DE) .................. 10 2012 209 331

(51) Int. Cl.
*H01B 1/16* (2006.01)
*C09D 5/08* (2006.01)
(Continued)

(52) U.S. Cl.
CPC .  *C09D 5/08* (2013.01); *C03C 8/02* (2013.01); *C03C 8/14* (2013.01); *C04B 35/01* (2013.01);
(Continued)

(58) Field of Classification Search
CPC .............. H01B 1/00; H01B 1/16; C09D 5/24; C03C 3/00; C03C 4/14; C03C 12/00; C03C 14/06; C03C 2201/00
See application file for complete search history.

(56) References Cited

U.S. PATENT DOCUMENTS

| 4,842,959 A * | 6/1989 | Maeda ................... H05K 1/053 |
| | | 428/432 |
| 4,919,991 A * | 4/1990 | Gadkaree .............. C03C 14/002 |
| | | 428/107 |

(Continued)

FOREIGN PATENT DOCUMENTS

JP    2000090733    3/2000

OTHER PUBLICATIONS

Machine Translation of JP2000-090733A, Jan. 21, 2015.*
(Continued)

*Primary Examiner* — Mark Kopec
(74) *Attorney, Agent, or Firm* — Duane Morris LLP; J. Rodman Steele, Jr.; Gregory M. Lefkowitz

(57) ABSTRACT

A description is given of an electronically conductive enamel composition, more particularly for anti-corrosion coatings.

15 Claims, 3 Drawing Sheets

Figure 1:
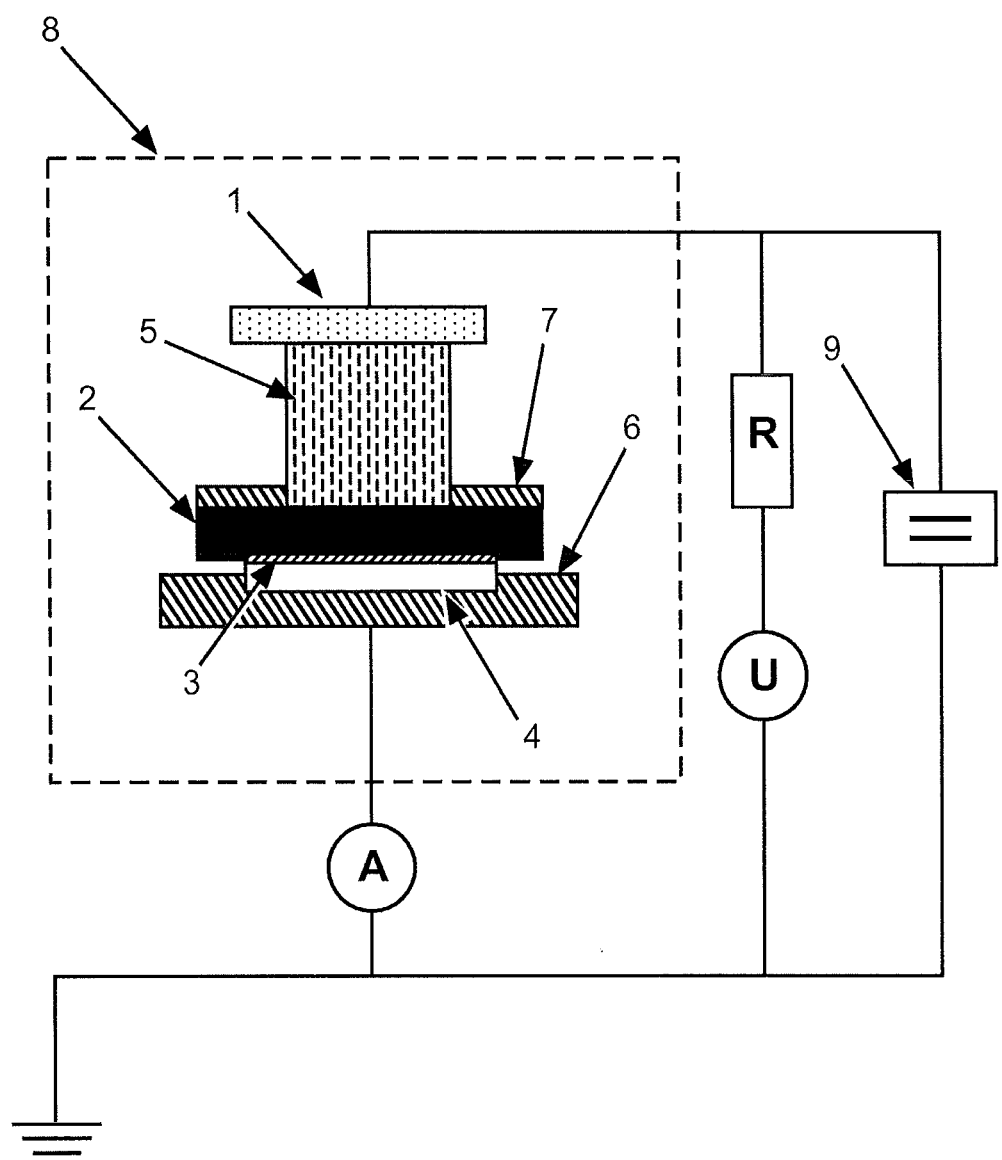

(51) Int. Cl.
*H01B 1/18* (2006.01)
*C03C 8/02* (2006.01)
*C03C 8/14* (2006.01)
*C04B 35/01* (2006.01)
*C04B 35/583* (2006.01)
*C09D 5/24* (2006.01)

(52) U.S. Cl.
CPC ............... *C04B 35/583* (2013.01); *C09D 5/24* (2013.01); *H01B 1/16* (2013.01); *H01B 1/18* (2013.01); *Y10T 428/25* (2015.01)

(56) References Cited

U.S. PATENT DOCUMENTS

| | | | | |
|---|---|---|---|---|
| 4,971,856 | A * | 11/1990 | Karp et al. | 428/209 |
| 7,435,361 | B2 * | 10/2008 | Carroll et al. | 252/514 |
| 2004/0077477 | A1 * | 4/2004 | Gazo | 501/19 |
| 2004/0084659 | A1 | 5/2004 | Imai et al. | |
| 2011/0303883 | A1 | 12/2011 | Ishihara | |
| 2012/0152341 | A1 * | 6/2012 | Li et al. | 136/256 |
| 2012/0152345 | A1 * | 6/2012 | Rajendran | 136/256 |
| 2013/0192670 | A1 * | 8/2013 | Hang et al. | 136/256 |

OTHER PUBLICATIONS

"Semimetal", Wikipedia, Oct. 9, 2010, web.archive.org/web/20101009071124/http://en.wikipedia.org/wiki/Semimetal.*

Stapa Il Hydrolan 9157, Technical Data Sheet, http://www.eckart.net/uploads/tx_driveeckartproducts/EE-05416.pdf, Mar. 2013.*

Matweb.com datashhet Corning Zinc Borosilicate Glass material data sheet (no date).*

Lopez-Esteban et al "Wet processing and characterization of ZrO2/stainless steel composites . . . ", Materials Research, vol. 4, No. 3, 217-222 (2001).*

Rawle, Alan, "Basic Principles of Particle Size Analysis," Jan. 1, 2008, XP55009141, Gefunden im Internet: URL: http://www.rci.rutgers.edu/~moghe/PSD Basics.pdf [gefunden am Oct. 1, 2011].

* cited by examiner

ELECTRONICALLY CONDUCTIVE ENAMEL COMPOSITION

CROSS-REFERENCE TO RELATED APPLICATIONS

This application is a §371 national stage entry of International Application No. PCT/EP2012/074615, filed Dec. 6, 2012, which claims priority to German Patent Application No. 10 2011 087 818.1 filed Dec. 6, 2011 and German Patent Application No. 10 2012 209 331.1 filed Jun. 1, 2012, the entire contents of which are incorporated herein by reference.

The present invention concerns an electronically conductive enamel composition, more particularly for anti-corrosion coatings.

Enamel coatings are in particular used for protecting surfaces from atmospheric and chemical effects (e.g. of strong acids, dilute alkalis and so on), especially under high thermal load. Enamel coatings are suitable for protecting surfaces in metallic materials such as cast iron, steel or aluminium. Typical applications include the linings of boilers, apparatus and reactors, pipelines and mounting parts, reservoirs, in particular for the storage of corrosive media, and vats.

Enamel is a preferably vitreous solidified mass obtained by melting suitable raw materials (see below) and then fritting (quenching), having an inorganic, essentially oxidic composition, which is fused onto a work piece, for example in metal, in one or more layers.

The production of enamel comprises two thermal process stages, namely the production of a glass melt and the fusing (firing) of a mass formed by quenching (fritting) the glass melt onto the work piece to be coated, this stage also being referred to as enamelling. The two-stage thermal process lowers the temperature required for the re-fusing by several hundred degrees and as a result also the thermal loading of the work piece to be coated.

In the first stage of the process a mixture comprising raw materials for glass production such as quartz, feldspar, soda, potash, borax, sodium nitrate and/or fluorite and optional additives (bonding oxides, opacifiers, pigments) is melted at approximately 1200° C. and then fritted (lowered into water or quenched). The frit obtained in this way is finely ground, if necessary mixed with additives such as for example coloured pigments and applied as an aqueous suspension (slip) or as a fine powder to the pre-treated (cleaned and possibly roughened) work piece surface and there fused once again. The re-fusing or firing temperature of enamel is in the range 600° C. to 900° C., and depends on the substrate material, the composition of the material to be fired and the firing time.

Enamel contains as glass-forming oxides (network-formers) silicon dioxide and boron trioxide. In order to keep the re-fusing or firing temperature of the enamel as low as possible and to increase the coefficients of thermal expansion, sodium oxide and potassium oxide are added as network modifiers; to adjust the chemical stability and the devitrification behaviour aluminium oxide is also added.

The frit can be applied to a work piece in a single layer or in multiple layers. With multi-layer application, a distinction is drawn between the ground-coat enamel and the covering enamel. The main task of the ground-coat enamel is to provide adhesion. In addition, it has to compensate for the differences in the coefficients of thermal expansion between substrate and covering enamel. For the enamelling of cast iron or steel, in particular, the ground-coat enamel contains the bonding oxides of cobalt and/or nickel, which are added during the production of the frit to the glass melt. Since the ground-coat enamel often has an irregularly coloured, sometimes blistered and usually non-smooth surface, further covering enamelling is then carried out. To this end colouring heavy metal oxides are melted into the frit for the covering enamel or during grinding of the frit pigments, e.g. in the form of cobalt, iron, manganese, chromium or copper oxide are added. Depending on the desired optical effect the covering enamel contains colouring additives and/or opacifiers.

In the following the material resulting from the fusing (firing) of the frit (including the abovementioned additives such as bonding oxides, opacifiers, ceramic pigments and colouring oxides) to the surface of the work piece to be coated (substrate) is referred to as the enamel matrix.

The frit, including the abovementioned additives such as bonding oxides, opacifiers, ceramic pigments and colouring oxides, which is applied to the work piece to be enamelled, is referred to in the following also as "raw materials for formation of an enamel matrix" or enamel raw materials.

Due to its composition as described above, the enamel matrix is an electrical insulator, which up to a certain electrical potential difference (dependent upon the layer thickness) or a certain electrical field strength transports no charge carriers. If in an apparatus or reservoir provided with an enamel coating and made from a metallic, and thus electrically conducting, material non-conductive fluids or certain solids are processed, friction can result in an electrostatic discharge. If as a result of this electrostatic discharge the critical electrical field strength is reached, an undesired breakdown of the enamel layer occurs, during which the charge carrier is suddenly transported through the damaged area that has formed. During such an undesired breakdown the enamel layer sustains localised, irreversible damage. The damaged area results on the one hand in a failure of the insulation effect of the enamel layer, for the discharge now continues in a localised manner via the damaged area, and on the other in a failure of the anti-corrosion effect of the enamel layer, for in the vicinity of the damaged area the material to be protected is exposed in a localised manner to the corrosive medium, with the commencement of pitting corrosion.

So there is a need to form enamel coatings in such a way that an electrostatic discharge can be dissipated. To this end it has been proposed, inter alia, to embed noble metal particles or noble metal colloids in the enamel matrix. Such enamel layers modified by embedding noble metal particles or noble metal colloids are also used for applications in medical engineering and biotechnology, wherein the noble metal particles or noble metal colloids embedded in the enamel matrix are silver particles, which have an antimicrobial effect. Use of noble meals is disadvantageous, however, because of the high material costs. In addition, with noble metal colloids and particles there is a danger of these being washed out of the enamel matrix, so that the electronic conductivity is not permanently guaranteed.

Alternatively it has been proposed to introduce an intermediate layer containing conductive nanoscale particles into an enamel layer. Here a layered structure like that of a capacitor is sought, in which the dissipation of the of the charge carriers from the intermediate layer takes place locally and the charge carriers have to be transported though a thin, insulating enamel layer. This structure does not protect the enamel layer from disruptive discharge damage, however, and due to the upper insulating enamel layer limits the maximum possible electrical field strength. Our own trials with such a structure have shown that the maximum possible field strength is insufficient for certain application, e.g. collecting electrodes of electrostatic precipitators (electrostatic filters).

The object of the present invention is therefore to provide an electronically conductive enamel composition, more particularly for anti-corrosion coatings, which does not have the abovementioned disadvantages of the prior art. The enamel composition according to the invention is, inter alia, suitable for the coating of reactors and reservoirs in the chemical industry.

The enamel composition according to the invention is particularly suitable for coating the collecting electrode of an electrostatic precipitator (electrostatic filter). Here the requirements of breakdown resistance of the enamel layer are particularly high, since here, due to an active voltage source in the medium coming into contact with the enamel layer, high concentrations of charge carriers are generated, e.g. a constantly very high external electrical voltage potential acts from the outside on the surface of the enamel body.

This object is achieved according to the invention by an electronically conductive enamel composition comprising or consisting of (i) an enamel matrix melting at a temperature in the range 600° C. to 900° C. and
(ii) particles, embedded in the enamel matrix, of one or more electronically conductive materials, which are not noble metals, wherein the particles (ii)
  have a particle size of 700 µm or smaller, preferably 300 µm or smaller, more preferably 150 µm or smaller, more preferably still 100 µm or smaller, particularly preferably 38 µm or smaller,
  and are selected from the group consisting of
    (a) particles of carbon-based electronically conductive materials,
    (b) particles of other electronically conductive materials, which are not noble metals,
    (c) particles made up of a combination of carbon-based electronically conductive materials and other electronically conductive materials,
  and the total concentration of the particles (ii) is in the range 0.09 vol % to 82.6 vol %, preferably in the range 0.18 vol % to 67.8 vol %, more preferably in the range 1.9 vol % to 55.2 vol %, particularly preferably in the range 3.0 vol % to 44.2 vol %, with reference to the sum of the volumes of the enamel matrix (i) and the particles (ii), wherein the total concentration of particles (a) of carbon-based electronically conductive materials is 48 vol % or less with reference to the sum of the volumes of the enamel matrix (i) and the particles (a).

Here the density of the enamel matrix is preferably in the range 1.5 g/cm³ to approximately 2.9 g/cm³, preferably 2 g/cm³ to 2.5 g/cm³, the density of the particles (b) or (c) is in the range 5.5 to 8.5 g/cm³, preferably 6 to 7.5 g/cm³ and the density of the particles (a) is in the range 2.1 g/cm³ to 2.3 g/cm³. Thus in a preferred embodiment of the invention the total concentration of particles (ii) is in the range 0.5 wt % to 90 wt %, preferably in the range 1 wt % to 80 wt %, more preferably in the range 10 wt % to 70 wt %, particularly preferably in the range 15 wt % to 60 wt %, with reference to the sum of the masses of the enamel matrix (i) and the particles (ii), wherein the total concentration of particles (a) of carbon-based electronically conductive materials is 40 wt % or less with reference to the sum of the masses of the enamel matrix (i) and the particles (a).

The present invention thus also concerns an electronically conductive enamel composition comprising or consisting of (i) an enamel matrix melting at a temperature in the range 600° C. to 900° C., preferably in the range 600 to 750° C., and
(ii) particles, embedded in the enamel matrix, of one or more electronically conductive materials, which are not noble metals, wherein the particles (ii)
  have a particle size of 700 µm or smaller, preferably 300 µm or smaller, more preferably 150 µm or smaller, more preferably still 100 µm or smaller, particularly preferably 38 µm or smaller,
  and are selected from the group consisting of
    (a) particles of carbon-based electronically conductive materials,
    (b) particles of other electronically conductive materials, which are not noble metals,
    (c) particles made up of a combination of carbon-based electronically conductive materials and other electronically conductive materials, which are not noble metals;
  and the total concentration of the particles (ii) is in the range 0.5 wt % to 90 wt %, preferably in the range 1 wt % to 80 wt %, more preferably in the range 10 wt % to 70 wt %, particularly preferably in the range 15 wt % to 60 wt %, with reference to the sum of the masses of the enamel matrix (i) and the particles (ii),
  wherein the total concentration of particles (a) of carbon-based electronically conductive materials is 40 wt % or less with reference to the sum of the masses of the enamel matrix (i) and the particles (a).

Here the term "enamel composition" designates the entirety of the (i) enamel matrix (as defined above), (ii) the particles, embedded in the enamel matrix, of one or more electronically conductive materials (as defined above), and optionally further constituents, which are neither a constituent of the enamel matrix (i) nor particles (ii), embedded therein, of one or more electronically conductive materials as defined above.

"Electronically conductive" means in connection with the present invention that the current transport is performed by electrons.

Enamel coatings having the enamel composition according to the invention, especially in the preferred embodiments thereof, allow the formation of a homogenous electronically conductive layer, which allows across its entire surface an even dissipation of electrical charges and furthermore guarantees the creation of an evenly distributed electrical field. Creating an evenly distributed electrical field means that a lower charge quantity per unit of surface area has to be dissipated than in the areas of higher field line concentration of a field with the same field strength distributed unevenly across the surface, because the even field structure means that localised high field concentrations are avoided. As a result of the selection according to the invention of the type, the particle shape and size, and the concentration of the particles of one or more electronically conductive materials, a certain maximum charge dissipation per unit of surface area can be guaranteed. Further aspects of the invention concern a coating, more particularly an anti-corrosion coating, comprising an enamel composition according to the invention or consisting of an enamel composition according to the invention, article comprising a base body and a coating according to the invention arranged on the surface or a portion of the surface of the base body, and a method for producing such an article according to the invention.

Further aspects, details and advantages of the invention can be inferred from the following description, the embodiments, the figures and the attached claims.

Figure 2:
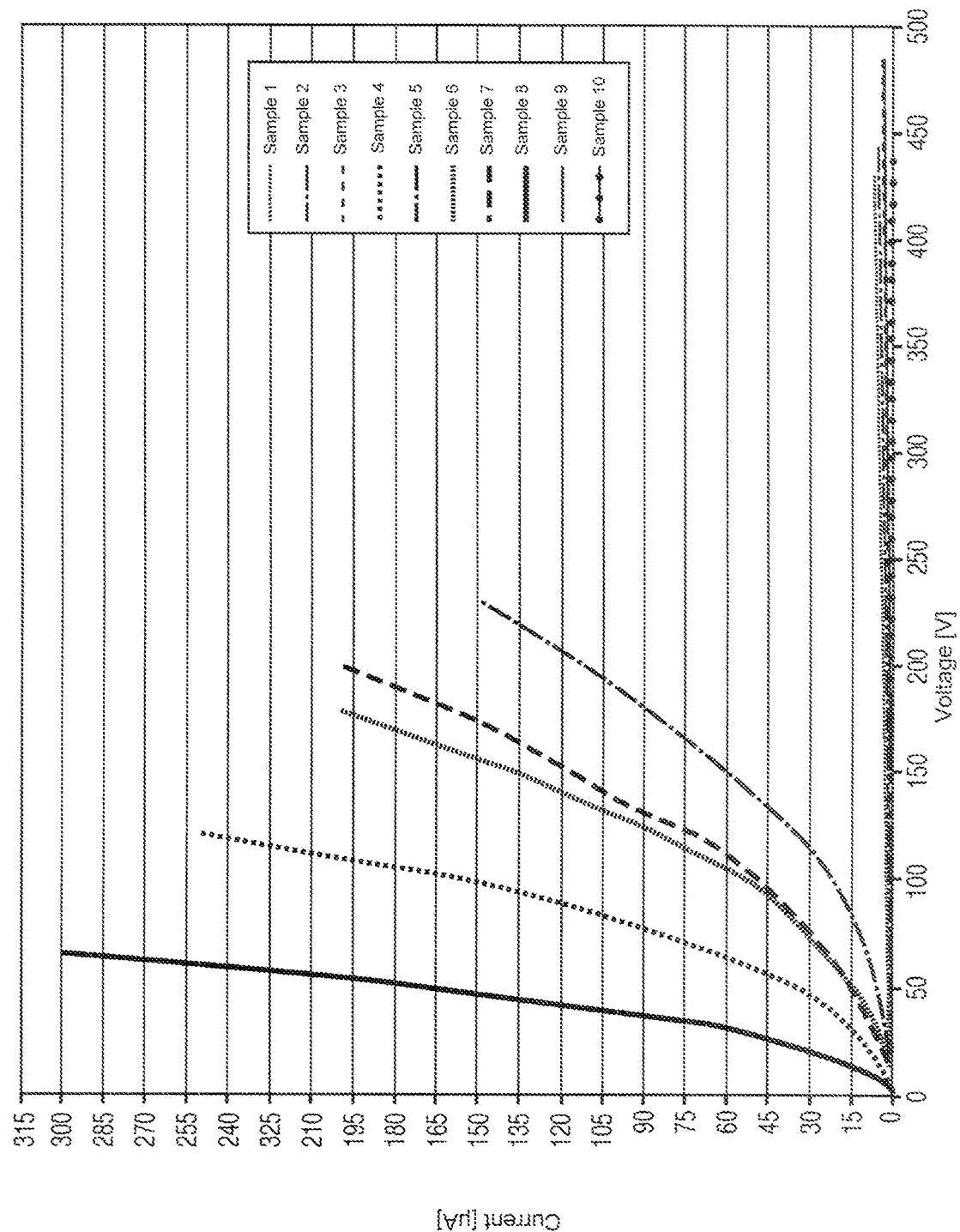
Figure 3:
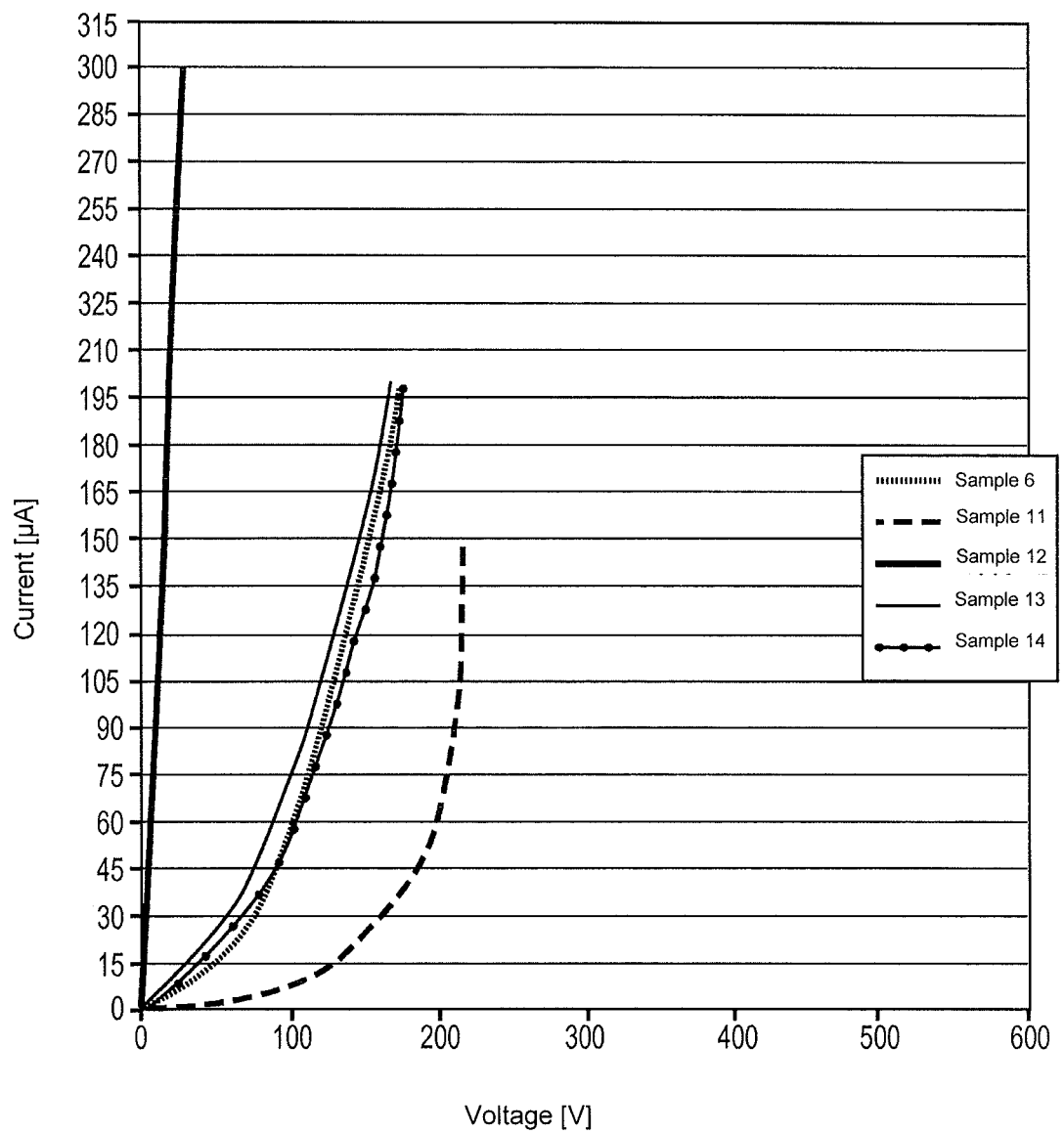

The figures show as follows:

FIG. 1 the schematic structure of the test bench for calculating the conductivity of enamel layers;

FIGS. 2 and 3 Current-voltage characteristics of specimens having enamel coatings.

For the enamel composition according to the invention the enamel matrix must be selected so that it melts at temperatures in the rage 600° C. to 900° C. Thus the firing process in the production of the enamel composition takes place at a temperature in the range 600° C. to 900° C. Our own investigations have shown that at a firing temperature in excess of 900° C. makes the production of enamel composition having a homogenous distribution of the embedded particles more difficult, since the embedded particles float on the surface of the melt and are oxidised due to contact with the atmospheric oxygen or the oxygen contained in the enamel matrix. A temperature range of 600 to 860° C. is preferred, and for relatively small layer thicknesses a temperature range of 600 to 750° C., so that the danger of oxidation of the embedded particles is particularly low. For many applications, however, it may be necessary to use an enamel matrix which melts at a temperature in the range 600° C. to 900° C., which is outside of these preferred ranges.

Apart from that, the present invention calls for no restrictions concerning the composition of the enamel matrix, the enamel matrix compositions normally used for the respective application can be utilized or the raw materials (frits) normally used for their manufacture. Here it is preferable in some applications, for the enamel matrix of the enamel composition according to the invention to contain boron nitride, for in this way the abrasion resistance of the enamel coating is improved. Furthermore, in some cases it is preferable for the enamel composition according to the invention to contain ground waste glass (also referred to as "glass milk"), or both ground waste glass and boron nitride. These additives are, however, not mandatory for the enamel composition according to the invention. Where the enamel composition according to the invention does contain boron nitride and/or ground waste glass, these constituents are included in the enamel matrix (i) in the following description.

The enamel composition according to the invention contains particles, embedded in the enamel matrix, of one or more electronically conductive materials, which are not noble metals, wherein for the size and concentration of the particles the defined-above criteria apply. Our own investigations have shown that through the selection according to the invention of the enamel matrix and of the type, concentration and size of the particles of one or more electronically conductive materials, in particular in the variants preferred according to the invention, enamel compositions can be obtained, in which the embedded particles of one or more electronically conductive materials are homogenously distributed.

"Particles of one or more electronically conductive materials" means here, that optionally, apart from a first kind of particle from a first electronically conductive material, one or more further kinds of particles each from a further electronically conductive material are embedded in the enamel matrix. By way of example, particles from various stainless steel alloys can be embedded in the enamel matrix, or particles of a metallic electronically conductive material and particles of a carbon-based electronically conductive material. Here an electronically conductive material, from which the embedded particles in the enamel matrix are formed, can for its part be a mixture or combination of various materials, e.g. an alloy of a number of metals.

It is not ruled out that the enamel compositions according to the invention contain, in addition to the abovementioned particles of one or more electronically conductive materials, which are not noble metals, also particles of noble metals which are embedded in the enamel matrix. The enamel composition according to the invention preferably contains less than 1 wt % of noble metals, with reference to the sum of the masses of the enamel matrix (i) and the noble metals contained, more preferably less than 0.5 wt % of noble metals, with reference to the sum of the masses of enamel matrix (i) and the noble metals contained and particularly preferably less than 0.1 wt % of noble metals, with reference to the sum of the masses of enamel matrix (i) and the noble metals contained. The enamel composition according to the invention preferably contains less than 0.1 vol % of noble metals, with reference to the sum of the volumes of the enamel matrix (i) and the noble metals contained, more preferably less than 0.01 vol % of noble metals, with reference to the sum of the volumes of the enamel matrix (i) and the noble metals contained and particularly preferably less than 0.001 vol % of noble metals with reference to the sum of the volumes of the enamel matrix (i) and the noble metals contained. The enamel composition according to the invention particularly preferably contains no noble metals. Noble metals means metals selected from the group consisting of gold, silver, mercury, rhenium, ruthenium, rhodium, palladium, osmium, iridium and platinum.

Where the electronically conductive enamel composition contains noble metals, the concentration of the embedded particles of one or more electronically conductive materials, which are not noble metals, is however sufficient to guarantee electronic conductivity, so that a noble metal-free, but otherwise identical comparative enamel composition is likewise electronically conductive.

The electronically conductive materials embedded according to the invention in the enamel matrix are preferably selected from the group of metallic electronically conductive materials and/or from the group consisting of graphite, graphite expandate, glassy carbon, carbon black, soot and carbon fibres.

Metallic electronically conductive materials are preferably selected from the group of stainless steel alloys (alloyed stainless steels).

Carbon-based electronically conductive materials are materials consisting of carbon or containing elementary carbon as an essential constituent (90 wt % or more, preferably 92 wt % or more). The carbon-based electronically conductive materials are preferably selected from the group consisting of graphite, glassy carbon, graphite expandate, carbon black, soot and carbon fibres.

Graphite is the hexagonal or rhombohedral crystalline, stable modification of carbon. This can involve natural graphite (a naturally occurring mineral, in which carbon atoms are arranged in parallel layers one on top of the other in a hexagonal crystal lattice) or synthetic (artificially manufactured) graphite. Synthetic graphite can also be present in the form of fibres (graphite fibres). Because of its structure made up of layers one on top of the other, graphite exhibits exceptional anisotropy of the physical and chemical properties.

Glassy carbon is a granular, non-graphitisable form of carbon having a high isotropy of the physical and chemical properties. The surfaces of this material have a glassy appearance.

Expanded graphite (graphite expandate) is manufactured from natural graphite flakes with well-ordered crystalline structures. In the production process the flakes, through chemical treatment (formation of an intercalation compound in the form of a graphite salt) and then thermal treatment (decomposition of the intercalation compound at approximately 1000° C.), experience an expansion in volume perpendicularly to the layers by a factor of between 200 and 400. Loose "worm"-like particles result, which are further processed, for example by milling, compounding, pressing, laminating and calendering. Here the graphite retains its inherently high thermal and electronic conductivity, which because of the hexagonal lattice structure is highly directionally-dependent (anisotropic).

Soot is a form of carbon which forms upon incomplete combustion or thermal decomposition of vaporous carbon-containing substances.

Carbon black is a colloidal carbon material manufactured industrially by thermal decomposition or incomplete combustion of carbons under controlled conditions.

Carbon fibres are fibres, comprising at least 92 wt % carbon. They can be obtained by gas phase separation of carbon from gaseous hydrocarbons or pyrolysis of carbonaceous precursor fibres. In carbon fibres carbon is not present in the three-dimensional crystal structure of the graphite.

In order to achieve a homogenous distribution of the embedded particles, it is crucial that during manufacture of the enamel composition, e.g. when fusing onto a substrate, floating of the particles on the molten enamel is avoided. Such floating of the particles leads to a concentration of these particles on the surface of the enamel, resulting in an enamel composition having a rough and porous surface. As a result of contact of the particles floating on the surface with atmospheric oxygen or oxygen contained in the enamel matrix and the high temperatures during firing, there is a danger of oxidation of the particles, which can lead to a loss of electronic conductivity. Furthermore, because of the roughness and porosity of the surface the resistance of such layers to abrasion and corrosion is significantly reduced.

A criterion to be applied when selecting the electronically conductive material(s) and choosing the concentration and size of the particles to be used, is the wettability of the electronically conductive material though the enamel matrix. Our own investigations have shown that particles of metals, especially in stainless steel, are characterised by a high wettability through the enamel matrix and can therefore be distributed particularly homogenously in the enamel matrix. With particles (a) of carbon-based electronically conductive materials the wettability through the enamel matrix is less pronounced, and therefore these particles can only be distributed homogenously in lower concentrations in the enamel matrix.

The concentration of the electronically conductive particles (ii) is in the range 0.09 vol % to 82.6 vol %, preferably in the range 0.18 vol % to 67.8 vol %, more preferably in the range 1.9 vol % to 55.2 vol %, particularly preferably in the range 3.0 vol % to 44.2 vol %, with reference to the sum of the volumes of the enamel matrix (i) and the particles (ii). In a preferred embodiment the concentration of the electronically conductive particles (ii) is in the range 0.5 wt % to 90 wt %, preferably in the range 1 wt % to 80 wt %, more preferably in the range 10 wt % to 70 wt %, particularly preferably in the range 15 wt % to 60 wt %, with reference to the sum of the masses of the enamel matrix and the particles of one or more electronically conductive materials.

It is important to keep in mind, however, that the surface of a coating comprising an enamel composition according to the invention at relatively high concentrations in the enamel matrix of embedded particles of one or more electronically conductive materials can be rough and porous and thus susceptible to corrosion. So, when choosing the concentration of the embedded particles of one or more electronically conductive materials in general a balance has to be reached between requirements for electronic conductivity and the surface quality.

For particles of carbon-based electronically conductive materials, however, it is required that the total concentration of particles (a) of carbon-based electronically conductive materials is 48 vol % or less, in a preferred embodiment 40 wt % or less, with reference to the sum of the volumes or masses, respectively, of the enamel matrix (i) and the particles (a).

It is furthermore preferable that
the total concentration of particles of an electronically conductive material selected from the group consisting of graphite, graphite expandate, glassy carbon, carbon black and soot is 48 vol % or less, preferably 6.8 vol % or less, with reference to the sum of the volumes of the enamel matrix (i) and the particles of an electronically conductive material selected from the group consisting of graphite, graphite expandate, glassy carbon, carbon black and soot,
the total concentration of particles in the form of carbon fibres is 48 vol % or less, preferably 15.2 vol % or less, with reference to the sum of the volumes of the enamel matrix (i) and the particles in the form of carbon fibres.

Furthermore, in certain cases it is preferable that
the total concentration of particles of an electronically conductive material selected from the group consisting of graphite, graphite expandate, glassy carbon, carbon black and soot is 40 wt % or less, preferably 5 wt % or less, with reference to the sum of the masses of enamel matrix (i) and the particles of an electronically conductive material selected from the group consisting of graphite, graphite expandate, glassy carbon, carbon black and soot,
the total concentration of particles in the form of carbon fibres is 40 wt % or less, preferably 10 wt % or less, with reference to the sum of the masses of the enamel matrix (i) and the particles in the form of carbon fibres, wherein the density of the carbon fibres is preferably 1.8 g/cm$^3$.

The size of the particles of one or more electronically conductive materials embedded according to the invention in the enamel matrix is 700 μm or less, preferably 300 μm or smaller, in some preferred embodiments 38 μm or less, while for other embodiments particle sizes in the range 38 μm to 150 μm are preferred. Larger particles of a polydisperse particle size distribution, the particle size of which is the same as the total thickness of the enamel coating, or smaller only by a factor of 2 or 3 than the total thickness of the enamel layer, can create individual direct conductive contacts between the enamel surface and base body. This would result in a localised concentration of the charge carrier dissipation, however, rather than the even distribution of the charge carrier dissipation over the surface of the enamel layer sought by the invention. With a localised dissipation of large concentrations of charge carriers there is a danger of formation of a non-thermal plasma and electrical overloading, e.g. electrical breakdown, of the enamel body at the discharge points. Therefore, according to the invention, it is preferred if the ratio between particle size and layer thickness is less than 1, preferably less than 0.33 (1:3).

The particle fraction having the desired particle size is for example obtained by sieving. The term particle size denotes for approximately spherical particles (aspect ratio of approximately 1) the diameter, and for particles with another shape (aspect ratio>1) the largest dimension in each case, e.g. for fibrous particles the length or the diameter of the sphere with equivalent volume (equivalent diameter $d_v$). Mixtures of particles having different sizes can also be used.

The proportion of nanoscale particles (particle size <1 µm) in the particles of one or more electronically conductive materials embedded in the enamel matrix is preferably 50 vol % or less, more preferably 20 vol % or less, particularly preferably 10 vol % or less, quite particularly preferably 1 vol % or less. In a preferred embodiment of the invention the proportion of nanoscale particles is preferably 50 wt % or less, more preferably 20 wt % or less, particularly preferably 10 wt % or less, quite particularly preferably 1 wt % or less.

The particles embedded in the enamel matrix are preferably particles of one or more electronically conductive materials, having a melting point in the range 600° C. to 1800° C.

Here the electronically conductive material is preferably a stainless steel alloy.

In certain cases, according to the invention electronically conductive materials, especially stainless steel alloys, are preferably used having a melting point in the range of the melting temperature (firing temperature), of the enamel matrix. Through the fusing of the electronically conductive material during enamelling a virtually homogenous distribution of the electronically conductive material in the enamel matrix is achieved. Similarly preferred according to the invention are stainless steel alloys having a melting point above the melting temperature (firing temperature) of the enamel matrix. The stainless steel particles are wetted during firing by the molten enamel matrix and thus embedded with a homogenous distribution in the enamel matrix while largely retaining their original particle shape.

The homogeneity of the distribution of the particles of one or more electronically conductive materials embedded in the enamel matrix is also influenced by the particle size and shape and the concentration of the electronically conductive particles, the density of the electronically conductive particles and the wettability of the conductive particles.

Each embedded particle forms on the surface of the enamel layer a dissipation point for electrical charges. The more homogenous the distribution of the embedded particles of one or more electronically conductive materials is, the less susceptible the enamel layer is to electrical discharges (flashovers), for the more homogenous the distribution of the one or more electronically conductive materials is, the more evenly distributed is the quantity of charge carriers to be dissipated over the surface and the layer thickness of the coating. With an inhomogeneous distribution of the embedded particles of one or more electronically conductive materials, on the other hand, only a localised dissipation of the charge carriers is possible (at those points of the enamel coating at which a particle of an electronically conductive material is actually positioned). The discharge channels formed as a result of the localised presence of particles of one or more electronically conductive materials are —depending on the width or diameter of the discharge channel— limited in terms of the maximum quantity of charge carriers that can be discharged per unit of time. Therefore with an inhomogeneous distribution of the embedded particles of one or more electronically conductive materials there is, at least at high field strengths, still a danger of damage to the enamel layer from flashovers.

As a result of the more even distribution of the field lines in a homogenous distribution of the embedded particles a lower local field strength is established on the surface of the particles, thereby avoiding the field line concentration reaching or exceeding the value for the ignition voltage (flashover voltage) of the surrounding medium (air, fluid, etc.) and through the resultant ionisation of the medium generating additional charge carriers. The generation of additional charge carriers can lead to the amount of charge carriers present being higher than can be transported away via the discharge channels present in the enamel per unit of time. This can lead not only to localised heating, but also to damage to the enamel layer (as a result of the excessive localised potential difference an electrical breakdown the enamel layer) with an adverse effect on the corrosion protection.

The generation of secondary charge carriers on the enamel surface is particularly critical when enamel coatings are used in electrostatic precipitators (electrostatic filters). When used in reservoir and apparatus construction this effect is less critical, because the enamel composition according to the invention is, from a potential greater than zero, electronically conductive, so that the development of an electrical field or a potential difference as a result of charge carriers that cannot be dissipated is suppressed from the outset. Apparatus and reservoirs typically contain no active voltage source, generating charge carriers in the medium in contact with the enamel layer. Charges may be generated there as a result of friction or similar mechanisms, in any case. In the process, in any case thanks to the immediate charge dissipation via the electronically conductive enamel layer no strong field strengths are generated. In contrast, an electrostatic precipitator (electrostatic filter) has an active voltage source (discharge electrode and collecting electrode, the latter for example in the form of an earthed wall of the precipitator provided with an enamel coating), generating charge carriers in the medium in contact with the enamel layer. The charge carriers generated must be dissipated in order to avoid high field strengths on the collecting electrode. The strength of the electrical field can be equated with the number of field lines. The more field lines present, the more necessary it is that these are dissipated with an even distribution over the collecting electrode (enamel surface), in order to avoid secondary charge carriers being produced. If this does not happen, the additional charge carrier production favours the formation of a discharge path between the collecting electrode having an enamel coating and the discharge electrode of the electrostatic precipitator (back corona). As a result the possible operating voltage and thus the performance of the electrostatic precipitator are reduced.

The particles of one or more electronically conductive materials embedded in the enamel matrix comprise particles with a non-spherical and/or particles with a spherical shape.

The more the shape of the particles approximates to a sphere (spherical shape), the more homogenous the distribution of the embedded particles in the enamel matrix is. As a result the bundling of the field lines and thus their concentration per particle (each particle forms a discharge point for the current on the surface of the enamel layer) are reduced. Furthermore, with spherical particles the field lines, that encounter a particle, are distributed more evenly on the surface of the particle, whereas for non-spherical particles they concentrate on the tips of the particles. Particular preference here is for particles having a spherical particle shape, a particle size of 150 µm or less, preferably 38 µm or less and a narrow particle size distribution.

The present invention is not restricted to the use of spherical electronically conductive particles, however. For the homogenous distribution of the electronically conductive particles in the enamel matrix the wetting of the particle surface by the molten enamel during the firing process is of greater importance, and for the particles of an electronically conductive material the wetting by the molten enamel matrix increases with the size of the specific area of the particles. Non-spherical particles have a greater specific area than spherical ones thereby allowing greater wetting, but have the high concentration of field lines at their tip described above. Therefore, according to the invention, it is preferred that on the surface of an enamel layer according to the invention the electronically conductive particles are exclusively or predominantly spherical particles.

Through the combination of spherical and non-spherical particles and/or particles of various particle sizes the concentration of particles necessary to reach the percolation threshold (formation of continuous electronic conduction paths) can be reduced. The capability to form networks and thus the concentration of the embedded particles necessary to reach the percolation threshold is highly dependent upon the particle shape, the particle size and the size distribution of the embedded particles. Additives of large particle having a broad particle size distribution even at low contents in the matrix form more continuous networks than additive of small particle having a narrow particle size distribution. For example, particles having a longitudinally extended shape (e.g. graphite expandate or carbon fibres) can form conductive bridges between smaller, e.g. spherical particles. Smaller spherical particles can for their part bridge the spaces between larger, bulky particles. Particular preference is for combinations of particles having a particle size in the range 38 to 150 µm and particles having a particle size of smaller than 38 µm.

The electronic conductivity of an enamel composition according to the invention is particularly at a voltage of 100 V, $1*10^{-13}$ [S/cm] or more, preferably $1*10^{-12}$ [S/cm] or more, particularly preferably $4*10^{-8}$ [S/cm] or more. At a voltage of 40 kV the electronic conductivity of an enamel composition according to the invention is particularly $1*10^{-5}$ [S/cm] or more, more preferably $1*10^{1}$ [S/cm] or more, particularly preferably $1.4*10^{4}$ [S/cm] or more.

A preferred enamel composition according to the invention comprises (i) an enamel matrix as defined above and (ii) particles of one or more stainless steel alloys embedded in this enamel matrix in a concentration of 4.2 vol % to 44.2 vol %, particularly preferably 10.5 vol % to 44.2 vol %, with reference to the sum of the volumes of the enamel matrix (i) and the particles (ii) of one or more stainless steel alloys. A further preferred embodiment of the enamel composition according to the invention comprises particles of one or stainless steel alloys in a concentration of 20 wt % to 60 wt %, particularly preferably 40 wt % to 60 wt %, with reference to the sum of the masses of the enamel matrix (i) and the particles (ii) of one or more stainless steel alloys. In some preferred embodiments the particle size of the particles of one or more stainless steel alloys embedded in this matrix is less than 38 µm, whereas for other embodiments particle sizes in the range 38 µm to 150 µm are preferred.

Similarly preferred is an enamel composition according to the invention comprising (i) an enamel matrix as defined above and (ii) particles of one or more stainless steel alloys embedded in this enamel matrix and particles of one or more carbon-based electronically conductive materials embedded in this enamel matrix, wherein the total concentration of the particles of the stainless steel alloys and the particles of carbon-based electronically conductive materials is 4.2 vol % to 34.5 Vol. %, with reference to the sum of the volumes of the enamel matrix (i) and the electronically conductive particles (ii), and the ratio of the volume of the particles of the stainless steel alloys to the particles of carbon-based electronically conductive materials is in the range 1:1 to 50:1, preferably 4:1 to 6:1. In a variant particularly preferred according to the invention of this enamel composition according to the invention the total concentration of the particles of the stainless steel alloys and the particles of carbon-based electronically conductive materials is 20 wt % to 50 wt %, with reference to the sum of the masses of the enamel matrix (i) and the particles (ii), and the ratio of the masses of the particles of the stainless steel alloys to the particles of carbon-based electronically conductive materials is in the range 1:1 to 10:1, preferably 4:1 to 6:1.

The particle size of the particles of one or more stainless steel alloys embedded in this enamel matrix and/or the particles of one or more carbon-based electronically conductive materials embedded in this enamel matrix is smaller than 38 µm. The carbon-based electronically conductive material is preferably graphite.

The enamel compositions preferred according to the invention are characterised by a high electronic conductivity and a high chemical stability. The enamel compositions particularly preferred according to the invention are suitable for coating the collecting electrode of an electrostatic precipitator, for because of their high electronic conductivity the formation of secondary charge carriers and the back corona thereof to the discharge electrode are avoided. For further details and properties of these enamel compositions preferred according to the invention reference is made to the embodiments.

A further aspect of the present invention concerns a coating, more particularly an anti-corrosion coating, comprising or consisting of an enamel composition according to the invention as defined above.

Here it is preferred if the coating according to the invention comprises or consists of an enamel composition according to the invention (as defined above) in a quantity in relation to the area of the surface to be coated of 0.01 g/cm$^2$ to 5 g/cm$^2$.

The coating according to the invention preferably has a thickness of 10 µm to 5000 µm, particularly preferably 200 µm to 500 µm.

In preferred embodiments the coating according to the invention comprises successive enamel layers, which differ from one another in terms of composition and/or layer thickness and/or firing temperature. Thus for example the composition of the enamel matrix or the type, concentration and/or size of the embedded particles of one or more electronically conductive materials, can vary between the different enamel layers.

In a preferred variant a coating according to the invention comprises a first enamel layer disposed directly on the surface of the base body to be coated and a second enamel layer disposed on the first enamel layer, wherein the first enamel layer contains an enamel composition comprising (i) an enamel matrix having a composition suitable for a ground-coat enamel and (ii) particles of one or more metallic electronically conductive materials embedded in this enamel matrix, and the second layer contains an enamel composition comprising (i) an enamel matrix having a composition suitable for a covering enamel and (ii) particles of one or more metallic electronically conductive materials embedded in this enamel matrix. In a further preferred variant between a first enamel layer disposed directly on the surface of the coated base body, containing an enamel composition comprising (i) an enamel matrix having a composition suitable for a ground-coat enamel and (ii) particles of one or more metallic electronically conductive materials embedded in this enamel matrix, and an enamel layer forming the outer coating, containing an enamel composition comprising (i) an enamel matrix having a composition suitable for a covering enamel and (ii) particles of one or more metallic electronically conductive materials embedded in this enamel matrix, one or more further enamel layers each containing an enamel composition according to the invention is or are disposed, wherein the enamel composition varies from layer to layer.

Of particular advantage is, for example, a coating comprising several enamel layers, wherein the concentration of the particles of one or more electronically conductive materials decreases from layer to layer as the distance from the surface of the coated base body increases. It has surprisingly transpired that with such a structure the coating allows both a high electronic conductivity and a smooth and sealed surface, which thus has a low susceptibility to corrosion, to be achieved. Of particular advantage is a coating having a multi-layer structure comprising a first enamel layer disposed directly on the surface of the coated base body and a second enamel layer disposed on the first enamel layer, wherein the concentration of the embedded particles of one or more electronically conductive materials in the first enamel layer is greater than in the second. In this way firstly an electronic conductivity is achieved which is higher than that of a coating comprising only a single enamel layer having a layer thickness and concentration of embedded particles of one or more electronically conductive materials like the second enamel layer of the coating having a multi-layer structure defined above, and secondly the surface quality and corrosion resistance are better than with a coating comprising only a single enamel layer having a layer thickness and concentration of embedded particles of one or more electronically conductive materials like the first enamel layer coating of the coating having a multi-layer structure defined above.

It is furthermore advantageous to form a coating according to the invention as a succession of several enamel layers, wherein the sum of the layer thicknesses of the individual enamel layers corresponds to the desired total thickness of the enamel layer. Here the thickness of each individual enamel layer is particularly of the same order of magnitude as the particle size of the embedded particles of one or more electronically conductive materials. As a result, in each of the individual enamel layers the embedded particles are relatively homogenously distributed providing a coating having a relatively homogeneous distribution of the embedded particles over the entire layer thickness. In this way a number of evenly distributed directly electronically conducting contacts between the base body and the enamel surface are provided.

In the embodiments of the coating according to the invention having several successive enamel layers, it is particularly preferable if in the outermost enamel layer, e.g. the enamel layer furthest away from the surface of the base body, the electronically conductive particles are almost exclusively spherical or approximately spherical particles, in order to avoid a localised increase in the field line distribution. In the layers beneath, e.g. disposed closer to the surface of the base body, however, in certain cases the use of non-spherical particles is advantageous due to the improved wetting by the molten enamel matrix during the firing process as a result of the higher specific area.

Particularly preferably, in coatings according to the invention the features of several or all the variants described above are combined with one another.

In a particularly preferable embodiment for certain applications a coating according to the invention comprises a first enamel layer disposed directly on the surface of the base body coated and a second enamel layer disposed on the first enamel layer, wherein the first enamel layer contains an enamel composition comprising (i) an enamel matrix having a composition suitable for a ground-coat and (ii) particles of one or more metallic electronically conductive materials embedded in this enamel matrix in a concentration in the range 4.2 to 82.6 vol %, preferably in the range 8.7 to 67.8 vol %, particularly preferably in the range 10.5 to 44.2 vol %, with reference to the sum of the volumes of the enamel matrix (i) and the particles (ii) of one or more metallic electronically conductive materials, and the second enamel layer contains an enamel composition comprising (i) an enamel matrix having a composition suitable for a covering enamel and (ii) particles of one or more metallic electronically conductive materials embedded in this enamel matrix in a concentration in the range 3.0 to 55.2 vol %, preferably 4.2 to 34.5 vol %, particularly preferably 4.2 to 22.1 vol % with reference to the sum of the volumes of the enamel matrix (i) and the particles (ii) of one or more metallic electronically conductive materials, wherein the concentration of the particles of one or more metallic electronically conductive materials in the first enamel layer is greater than the concentration of the particles of one or more metallic electronically conductive materials in the second enamel layer.

In a further particularly preferable embodiment for certain applications a coating according to the invention comprises an enamel layer disposed directly on the surface of the coated base body and a second enamel layer disposed on the first enamel layer, wherein the first enamel layer contains an enamel composition comprising (i) an enamel matrix having a composition suitable for a ground-coat and (ii) particles of one or more metallic electronically conductive materials embedded in this enamel matrix in a concentration in the range 20 to 90 wt %, preferably in the range 35 to 80 wt %, particularly preferably in the range 40 to 60 wt %, with reference to the sum of the masses of the enamel matrix (i) and the particles (ii) of one or more metallic electronically conductive materials, and the second enamel layer contains an enamel composition comprising (i) an enamel matrix having a composition suitable for a covering enamel and (ii) particles of one or more metallic electronically conductive materials embedded in this enamel matrix in a concentration in the range 15 to 70 wt %, preferably 20 to 50 wt %, particularly preferably 20 to 35 wt % with reference to the sum of the masses of the enamel matrix (i) and the particles (ii) of one or more metallic electronically conductive materials, wherein the concentration of the particles of one or more metallic electronically conductive materials in the first enamel layer is greater than the concentration of the particles of one or more metallic electronically conductive materials in the second enamel layer.

Here the particles embedded in the enamel matrix are preferably particles in stainless steel alloys, preferably having a particle size in the range 38 µm to 150 µm or having a particle size of 38 µm or smaller. The enamel matrix of the second enamel layer preferably contains boron nitride. In the first enamel layer the concentration of the particles of one or more metallic electronically conductive materials is preferably 44.2 vol % or less, preferably 10.5 to 39.2 vol % with reference to the sum of the volumes of the enamel matrix (i) and the particles (ii) of one or more metallic electronically conductive materials, particularly preferably 60 wt % or less, preferably 40 to 55 wt % with reference to the sum of the masses of the enamel matrix (i) and the particles (ii) of one or more metallic electronically conductive materials, and in second enamel layer the concentration of the particles of one or more metallic electronically conductive materials 26.0 vol % or less, preferably 4.2 to 22.1 vol % with reference to the sum of the volumes of the enamel matrix (i) and the particles (ii) of one or more metallic electronically conductive materials, particularly preferably 40 wt % or less, preferably 20 to 35 wt % with reference to the sum of the masses of the enamel matrix (i) and the particles (ii) of one or more metallic electronically conductive materials, wherein the concentration of the particles of one or more metallic electronically conductive materials in the first enamel layer is greater than the concentration of the particles of one or more metallic electronically conductive materials in the second enamel layer.

Particularly preferably several or all of the preferred properties described here are combined with one another.

In a special embodiment particularly preferred for certain applications a coating according to the invention comprises a first layer disposed directly on the surface of the coated base body and a second layer disposed on the first layer, wherein the first layer comprises an enamel composition of (i) an enamel matrix having a composition suitable for a ground-coat enamel and (ii) particles of a stainless steel embedded in this enamel matrix having a particle size of 38 µm or smaller in a concentration in the range 4.2 vol % to 82.6 vol %, preferably in the range 8.7 to 67.8 vol %, with reference to the sum of the volumes of the enamel matrix (i) and the particles (ii) of stainless steel, particularly preferably in the range 20 to 90 wt %, preferably in the range 35 to 80 wt %, with reference to the sum of the masses of the enamel matrix (i) and the particles (ii) of stainless steel, and the second layer comprises an enamel composition of (i) an enamel matrix having a composition suitable for a covering enamel, wherein the enamel matrix comprises boron nitride in a concentration of 0.1 to 33 wt %, with reference to the total mass of the enamel matrix, and (ii) particles of stainless steel embedded in this enamel matrix having a particle size of 38 µm or smaller in a concentration in the range 3.0 to 55.2 vol %, preferably 4.2 to 34.5 vol %, with reference to the sum of the volumes of the enamel matrix (i) and the particles (ii) of stainless steel, particularly preferably in the range 15 to 70 wt %, preferably 20 to 50 wt %, with reference to the sum of the masses of the enamel matrix (i) and the particles (ii) of stainless steel, wherein the concentration of the particles of one or more metallic electronically conductive materials in the first enamel layer is greater than the concentration of the particles of one or more metallic electronically conductive materials in the second enamel layer.

A further aspect of the present invention concerns an article comprising a base body and a coating according to the invention as defined above disposed on the surface or a portion of the surface of the base body. The coating according to the invention is preferably disposed on a steel surface of a base body.

The article having a coating according to the invention (as defined above) is particularly selected from the group consisting of dry, moist and wet electrostatic precipitators, particularly for cleaning corrosive waste gases, apparatus and reactors, pipeline and mounting parts, reservoirs and vats, particularly for storing corrosive media.

In certain cases it is preferred that the article comprises a base body in carbon steel, and a coating according to the invention disposed on a first portion of the surface of this base body comprising or consisting of an enamel matrix as defined above, and particles of stainless steel embedded in the enamel matrix, and a coating according to the invention disposed on a second portion of the surface of this base body comprising or consisting of an enamel matrix as defined above, and particles of stainless steel embedded in the enamel matrix, wherein the first portion and the second portion are located on opposing sides of the base body, e.g. the front and back or top and bottom or inside and outside of the base body.

The term "opposing sides" shall mean here for example the top and bottom or front and back of a flat base body, or the inside and outside of a base body in the form of a hollow body.

Enamel compositions according to the invention, wherein the electronically conductive material of the particles embedded in the enamel matrix is stainless steel, allow base bodies in carbon steel to be enamelled on both sides, e.g. on opposing lateral surface of the base body such as the front and back, top and bottom or inside and outside. For non-electronically conductive enamel compositions during the bilateral enamelling of a work piece in carbon steel, as a result of the outgassing of the hydrogen released in the steel during firing of the enamel coating, scale-like flaking of the enamel coating occurs. Therefore it has previously been necessary, for applications requiring bilateral enamelling, to use base bodies in a decarburised steel.

With bilateral coating of a base body in carbon steel with an enamel composition according to the invention, wherein the electronically conductive material of the particles embedded in the enamel matrix is stainless steel, on the other hand, this is not the case. It is presently assumed that the hydrogen released is dispersed via diffusion paths forming along the stainless steel particles embedded in the enamel matrix, and/or absorbed by the stainless steel particles embedded in the enamel matrix in the direct vicinity of the surface of the base body, so that the hydrogen partial pressure at the interface between the enamel coating and the base body in steel is reduced.

A bilateral enamel coating of a steel work piece is for example desirable for those applications in which a work piece is in bilateral contact (e.g. front and back, top and bottom, or inside and outside) with a corrosive medium. This concerns for example mounting parts such as baffles, deflectors, stirrers, static mixers and similar provided for the installation within reservoirs, apparatus and reactors.

Other examples are tube bundle- or plate-type heat exchangers for transfer of heat between corrosive media. In the prior art these are usually produced expensively from corrosion-resistant materials such as graphite or ceramic.

According to the invention tubes for a tube bundle heat exchanger are made from carbon steel, and provided both on the inside and the outside with an enamel composition according to the invention, wherein the electronically conductive material of particles embedded in the enamel matrix is stainless steel. According to the invention plates for a plate-type heat exchanger are made from carbon steel, and both the front and back provided with an enamel composition according to the invention, wherein the electronically conductive material of the particles embedded in the enamel matrix is stainless steel. Thus the invention allows materials such as graphite or ceramic which are expensive and difficult to process to be replaced.

A further aspect of the present invention concerns a method for producing an article according to the invention (as defined above). This method comprises the following steps:

(1) provision of a base body,
(2) provision of a mixture comprising raw materials for formation of an enamel matrix (i) at a firing temperature in the range 600° C. to 900° C. and (ii) particles of one or more electronically conductive materials, which are not noble metals, wherein the particles (ii)
   have a particle size of 700 μm or smaller, preferably 300 μm or smaller, more preferably 150 μm or smaller, more preferably still 100 μm or smaller, particularly preferably 38 μm or smaller,
   and are selected from the group consisting of
   (a) particles of carbon-based electronically conductive materials,
   (b) particles of other electronically conductive materials, which are not noble metals,
   (c) particles made up of a combination of carbon-based electronically conductive materials and other electronically conductive materials, which are not noble metals;
   and the total concentration of the particles (ii) is in the range 0.09 vol % to 82.6 vol %, preferably in the range 0.18 vol % to 67.8 vol %, more preferably in the range 1.9 vol % to 55.2 vol %, particularly preferably in the range 3.0 vol % to 44.2 vol %, with reference to the sum of the volumes of the enamel matrix (i) and the particles (ii), wherein the total concentration of particles (a) of carbon-based electronically conductive materials is 48 vol % or less with reference to the sum of the volumes of the enamel matrix (i) and the particles (a),
(3) application of the mixture to the surface or a portion of the surface of the base body,
(4) firing of the mixture applied at a temperature in the range 600° C. to 900° C. on the surface or area of the surface of the base body, to which the mixture has been applied in step (3), so that on the surface or portion of the surface of the base body, to which the mixture has been applied in step (3), a coating comprising an enamel matrix and (ii) particles, embedded in the enamel matrix, of one or more electronically conductive materials is formed,
(5) optional repetition of steps (2) to (4), wherein upon repetition of step (3) the mixture is applied to the area of the surface of the base body on which in a previous step (4) a coating has already been formed.

In a preferred embodiment in step (2) the total concentration of particles (ii) is in the range 0.5 wt % to 90 wt %, preferably in the range 1 wt % to 80 wt %, more preferably in the range 10 wt % to 70 wt %, particularly preferably in the range 15 wt % to 60 wt % with reference to the sum of the masses of raw materials for formation of an enamel matrix (i) and the particles (ii), wherein the total concentration of particles (a) of carbon-based electronically conductive materials is 40 wt % or less with reference to the sum of the masses of the enamel matrix (i) and the particles (a).

By repeating steps (2) to (4), wherein upon repetition of step (3) the mixture is applied to the area of the surface of the base body on which in a previous step (4) a coating has already been formed, multi-layer enamel coatings can be obtained, e.g. coatings comprising a first layer having an enamel matrix, which is a ground-coat enamel as described above and a layer having an enamel matrix, which is a covering enamel as described above, and possibly further layers in between.

The method according to the invention also comprises variants, wherein
   upon repetition of step (2) the composition of the mixture is varied compared to the mixture used in the previous step or steps (2) and/or
   upon repetition of step (3) the quantity of mixture applied is varied compared to the mixture applied in the previous step or steps (3) and/or
   upon repetition of step (4) the temperature of the firing within the specified range of 600° C. to 900° C. is varied compared to the previous step or steps (4).

That stated above is applicable to preferred configurations of coatings according to the invention comprising enamel layers applied and fired successively.

The lower the amount of mixture applied in step (3) and the higher the wettability of the electronically conductive particles, the more homogenously the embedded particles of one or more electronically conductive materials are distributed in the enamel matrix. It is therefore advantageous, to produce coatings according to the invention by a method comprising multiple repetitions of steps (2) to (4), wherein the quantity of the mixture to be applied to achieve the desired layer thickness is distributed across the individual steps (3).

This enables, upon repetition of step (2), the composition of the mixture to be varied so that it contains no particles of an electronically conductive material. In the interests of a homogenous distribution of the particles of an electronically conductive material in the coating this is less preferable however.

A further aspect of the present invention concerns a mixture for producing an enamel composition according to the invention, a coating according to the invention or an article according to the invention. This mixture comprises (i) raw materials, suitable for the formation of an enamel matrix at a firing temperature in the range 600° C. to 900° C., and (ii) particles of one or more electronically conductive materials as defined above, wherein the particles have a particle size of 700 μm or smaller, preferably 300 μm or smaller, more preferably 150 μm or smaller, more preferably still 100 μm or smaller, particularly preferably 38 μm or smaller and the concentration of the particles (ii) is in the range 0.09 vol % to 82.6 vol %, preferably in the range 0.18 vol % to 67.8 vol %, more preferably in the range 1.9 vol % to 55.2 vol %, particularly preferably in the range 3.0 vol % to 44.2 vol %, with reference to the sum of the volumes of the enamel matrix (i) and the particles (ii), wherein the total concentration of particles (a) of carbon-based electronically conductive materials is 48 vol % or less with reference to the sum of the volumes of the enamel matrix (i) and the particles (a).

Here the concentration of the particles (ii) is particularly preferably in the range 0.5 wt % to 90 wt %, preferably in the range 1 wt % to 80 wt %, more preferably in the range 10 wt % to 70 wt %, particularly preferably in the range 15 wt % to 60 wt %, with reference to the sum of the masses of enamel raw materials and the particles of one or more electronically conductive materials, wherein the total concentration of particles (a) of carbon-based electronically conductive materials is 40 wt % or less, with reference to the sum of the masses of the enamel matrix (i) and the particles (a).

Here it is preferable for some applications that the raw materials for formation of the enamel matrix comprise boron nitride, as the result of this is an improvement in the abrasion resistance of the enamel coating. Furthermore, in a number of applications it is preferred that the raw materials for formation of the enamel matrix comprise ground waste glass (also known as "glass milk"), or both ground waste glass and boron nitride. These additives are not mandatory for producing an enamel composition according to the invention, however.

The mixture for producing an enamel composition according to the invention is obtained by mixing together raw materials suitable for the formation of an enamel matrix (i) at a firing temperature in the range 600° C. to 900° C., and particles (ii) of one or more electronically conductive materials (as defined above), wherein the particles have a particle size of 700 μm or smaller, preferably 300 μm or smaller, more preferably 100 μm or smaller, particularly preferably 38 μm or smaller and the concentration of the particles (ii) is in the range 0.09 vol % to 82.6 vol %, preferably in the range 0.18 vol % to 67.8 vol %, more preferably in the range 1.9 vol % to 55.2 vol %, particularly preferably in the range 3.0 vol % to 44.2 vol %, with reference to the sum of the volumes of the enamel matrix (i) and the particles (ii), wherein the total concentration of particles (a) of carbon-based electronically conductive materials is 48 vol % or less with reference to the sum of the volumes of the enamel matrix (i) and the particles (a), preferably in the range 0.5 wt % to 90 wt %, preferably in the range 1 wt % to 80 wt %, more preferably in the range 10 wt % to 70 wt %, particularly preferably in the range 15 wt % to 60 wt %, with reference to the sum of the masses of enamel raw materials and the particles of one or more electronically conductive materials, wherein the total concentration of particles (a) of carbon-based electronically conductive materials is 40 wt % or less with reference to the sum of the masses of the enamel matrix (i) and the particles (a).

The present invention is described in the following by means of embodiments.

Embodiments

1. Mixtures Used for Producing the Coatings

For the production of coatings according to the invention mixtures are used containing raw materials for producing an enamel matrix (density 2.28 g/cm$^3$), typically used for collecting electrodes of electrostatic precipitators, but also in reactors and reservoirs in the chemical industry, together with the particles of electronically conductive materials indicated in Tables 1 and/or 2.

As the metallic electronically conductive material, particles of the stainless steel alloy 316 L (density 6.83 g/cm$^3$ in each case) having a particle size <38 μm or particles of the stainless steel alloy Cold 100 having a particle size in the range 38 to 150 μm are used.

As the carbon-based electronically conductive material graphite particles having a particle size <38 μm are used (density 2.26 g/cm$^3$).

The concentration levels in wt % relate to the total mass of the coating mixture applied, e.g. the sum of the masses of the enamel raw materials used, the particles of stainless steel 316 L or Cold 100 and if applicable the particles of graphite.

The concentration levels in vol % relate to the total volume of the coating mixture applied, e.g. the sums of the volumes of the enamel raw materials used, the particles of stainless steel 316 L or Cold 100 and if applicable the particles of graphite.

The percentages by volume of the enamel matrix (i) and the particles (ii) are in each case determined pycnometrically.

Specimen 8 is not according to the invention, for the concentration of the graphite particles, with reference to the sum of the masses of enamel matrix and the graphite (e.g. without considering the particles of stainless steel) is 50 wt % and is thus outside the range according to the invention or, respectively, with reference to the sum of the volumes of the enamel matrix and the graphite (e.g. without considering the particles of stainless steel) 50.21 vol % and is thus outside the range according to the invention.

2. Firing of the Coatings

The coating compositions described above were applied to a base body in steel. The area coated here was square and measured 100 cm$^2$.

Firing of the enamel layers took place at a temperature in the range 600° C. to 900° C. and with a firing time of 3 to 6.5 min.

With specimens 3 and 6 initially in each case a mixture having the concentration of stainless steel particles indicated in Table 1 was applied and fired, and once the firing in process was complete the same mixture was again applied in a smaller quantity and fired. The coatings of specimens 3 and 6 therefore comprise in each case a first, thicker enamel layer (close to the substrate, e.g. internal), and a second thinner enamel layer (distant from the substrate, e.g. external), wherein in both enamel layers the concentration of the stainless steel particles was almost identical.

With specimen 8 (not according to the invention) during the firings graphite particles were seen floating on the surface of the melt. The result of this was an enamel layer having a porous and rough surface.

With specimens 9 and 10 initially in a first application of a mixture having a concentration of stainless steel particles of 50 wt % with reference to the sum of the masses of enamel raw materials used and the stainless steel particles (corresponding to 25.02 vol % with reference to the sum of the volumes of the enamel raw materials used and the stainless steel particles) was performed, followed by a second application of a mixture of enamel raw materials free from particles of electronically conductive materials. Here for specimen 9 initially the mixtures for the first enamel layer and for the second enamel layer (in each case as described above) were applied in succession and then fired. For specimen 10 initially the mixture for the first enamel layer (as described above) was applied and fired, and then the mixture for the second enamel layer (as described above) was applied and fired.

The coatings of specimens 9 and 10 therefore comprise in each case a first, thicker enamel layer close to the substrate (e.g. internal), in which the concentration of stainless steel particles is 50 wt % with reference to the sum of the masses of enamel raw materials used and the stainless steel particles (corresponding to 25.02 vol % with reference to the sum of the volumes of the enamel raw materials used and the stainless steel particles) and a second thinner enamel layer distant from the substrate (e.g. external), in which the concentration of stainless steel particles is 0 wt % (corresponding to 0 vol %).

With specimens 13 and 14 initially in each case a mixture having the composition given in Table 2 under "First application" was applied in the quantity indicated in Table 2 and fired, and once the firing process was complete a mixture having the composition given in Table 2 under "Second application" was applied in the quantity indicated in Table 2 and fired. In the mixture used for the second application the concentration of stainless steel particles is less than in the mixture used for the first application. The coatings of specimens 13 and 14 therefore in each case comprise a first enamel layer (close to the substrate, e.g. internal), in which the concentration of the stainless steel particles is 50 wt % with reference to the sum of the masses of enamel raw materials used and the stainless steel particles (corresponding to 25.02 vol % with reference to the sum of the volumes of the enamel raw materials used and the stainless steel particles) and a second enamel layer (distant from the substrate, e.g. external), in which the concentration of stainless steel particles is less than 50 wt % with reference to the sum of the masses of enamel raw materials used and the stainless steel particles (less than 25.02 vol % with reference to the sum of the volumes of the enamel raw materials used and the stainless steel particles). The enamel raw materials in the mixture for the first application have a composition suitable for the formation of a ground-coat enamel, whereas the enamel raw materials in the mixture for the second application have a composition suitable for the formation of a covering enamel.

3. Recording of Current-Voltage Characteristics

The recording of current-voltage characteristics took place using the test bed shown in FIG. 1, built in accordance with standard VDE 0303-Part 30.

The surface of the HV electrode 1 in copper rests directly on the surface of the semiconductor body 5 (thickness 1 mm), which in turn rests on the surface of the test specimen 2 under test. The test specimen 2 under investigation is electrically connected with the HC electrode 4 in copper via the bonding 3. The HV electrode 4 has insulation 6 to the side and the back. Through an insulation 7 resting on the surface of the test specimen 2, in which a surface having an area of 25 cm$^2$ has been omitted, a defined surface of the test specimen 2 is exposed. This test set-up is surrounded by screening 8. The voltage is supplied by a DC generator 9. The current is measured by an ammeter A.

The ambient conditions (temperature and humidity) were kept constant during the trials, in order to avoid measuring errors due to variations in electrical air passage resistance.

FIG. 2 shows the current-voltage characteristics of specimens having enamel coatings according to the invention (specimens 1-7, 9 and 10) and of a specimen having an enamel coating not according to the invention (specimen 8). FIG. 3 shows the current-voltage characteristics of further specimens having an enamel coating according to the invention (specimens 11-14) and for comparison once again the current-voltage characteristic of specimen 6.

In the test set-up according to FIG. 1 between the copper electrodes 1 and 4 electrical resistances are connected in series (semiconductor body 5 and test specimen 2), the total resistance of which is given by the sum of the individual resistances. Since the resistances of the copper electrodes are negligible and the resistance of the semiconductor body 5 is defined on the basis of its material and dimensions, the resistance of the test specimen 2 is found by subtracting the resistance of the semiconductor body 5 from the total resistance.

The suitability of the enamel coatings tested to dissipate charge carriers generated improves with the steepness of the current-voltage characteristic.

Specimens 4-7 and 11-14 have characteristics whose slope becomes steeper with increasing voltage. This means that the resistance falls as the voltage increases, and the conductivity increases. These coatings are therefore in a position, even at high charge carrier concentrations, to guarantee the dissipation of the charge carriers and are therefore suitable for coating the collecting electrode of an electrostatic filter (electrostatic precipitator).

The specimens 1-3, 9 and 10 have characteristics with a flat, low-voltage-dependence slope. So, while they do not meet the requirements for the coating of collecting electrodes in electrostatic precipitators, they are suitable for other applications (e.g. apparatus and reservoirs, see above).

Specimen 8 (not according to the invention) has, due to the floating of the graphite during firing, a rough and porous surface, so that the resistance of the enamel coating to corrosion and abrasion is insufficient.

While specimen 12 is characterised by a particularly high conductivity, nevertheless, due to the high concentration of large stainless steel particles, it has a relatively rough and therefore possibly porous surface susceptible to corrosion. It is therefore desirable to improve the surface quality of this and in so doing at the same time keep to the resistance as low as possible.

The characteristics of specimens 11 and 13 show that the resistance of specimen 13 is smaller than that of specimen 11. The coating of specimen 13 comprises a first (internal) enamel layer having a concentration of stainless steel particles of 50 wt % (corresponding to 25.02 vol %) and a second (external) enamel layer having a concentration of stainless steel particles of 23 wt % (corresponding to 9.06 vol %), but the coating of specimen 11 on the other hand has just a single enamel layer having a concentration of stainless steel particles of 23 wt % (corresponding to 9.06 vol %), wherein the thickness of this single enamel layer of specimen 11 corresponds approximately to the thickness of the second enamel layer of specimen 13. The lower resistance, compared to specimen 11, of specimen 13 is surprising, for the coating of specimen 13 is thicker than that of specimen 11. Furthermore, a person skilled in the art would have expected a sequence of enamel layers of differing concentrations of stainless steel particles to behave like electrical resistors connected in series, such that the enamel layer having the lowest concentration of stainless steel particles (e.g. the highest resistance) determines the total resistance.

The characteristics of specimens 6, 13 and 14 show that the resistance of specimens 13 and 14 is similar to that of specimen 6. The coating of specimen 6 comprises a first (internal) enamel layer, the thickness of which and concentration of stainless steel particles are identical to the first (internal) layer of specimens 13 and 14, and a second (external) enamel layer, the thickness of which, with an identical concentration of stainless steel particles, is only half the thickness of the first (internal) enamel layer of the specimen 6. The similar resistances of specimens 6, 13 and 14 are surprising, for the coatings of specimens 13 and 14 are thicker than those of specimen 6 and in their second (external) enamel layer have a lower concentration of stainless steel particles than specimen 6. A person skilled in the art would have expected a sequence of enamel layers of differing concentrations of stainless steel particles to behave like electrical resistors connected in series, such that the enamel layer having the lowest concentration of stainless steel particles (e.g. the highest resistance) determines the total resistance.

This surprising effect allows, through a combination of an internal enamel layer having a high concentration of electronically conductive particles and an external enamel layer having a lower concentration of electronically conductive particles, a high electronic conductivity and a smooth and dense, and thus corrosion-resistant, surface to be created.

TABLE 1

| | Specimen No. | | | | | | | | | |
|---|---|---|---|---|---|---|---|---|---|---|
| | 1 | 2 | 3 | 4 | 5 | 6 | 7 | 8 | 9 | 10 |
| First application | | | | | | | | | | |
| Proportion of stainless steel alloy | | | | | | | | | | |
| [wt %] | 23 | 23 | 23 | 50 | 50 | 50 | 22 | 13 | 50 | 50 |
| [vol %] | 9.065 | 9.065 | 9.065 | 25.02 | 25.02 | 25.02 | 8.6 | 4.75 | 25.02 | 25.02 |
| Proportion of graphite/ [wt %] | 0 | 0 | 0 | 0 | 0 | 0 | 4 | 44 | 0 | 0 |
| vol % | | | | | | | 4.03 | 44.21 | | |
| Mass of enamel raw materials/[g] | 6 | 9 | 6 | 6 | 9 | 6 | 6 | 6 | 6 | 6 |
| Second application | | | | | | | | | | |
| Proportion of stainless steel alloy | | | | | | | | | | |
| [wt %] | — | — | 23 | — | — | 50 | — | — | 0 | 0 |
| [vol %] | | | 9.065 | | | 25.02 | | | | |
| Proportion of graphite/ [wt %] | — | — | 0 | — | — | 0 | — | — | 0 | 0 |
| Masse of enamel raw materials/[g] | — | — | 3 | — | — | 3 | — | — | 3 | 3 |

TABLE 2

| | Specimen No | | | |
|---|---|---|---|---|
| | 11 | 12 | 13 | 14 |
| First application | | | | |
| Proportion of stainless steel alloy | | | | |
| 316L [wt %] | 23 | 50 | 50 | 50 |
| [Vol-%] | 9.065 | 25.02 | 25.02 | 25.02 |
| Mass of enamel raw materials/ [g] | 6 | 6 | 6 | 6 |
| Second application | | | | |
| Proportion of stainless steel alloy | | | | |
| [wt %] | — | — | 23 | 33 |
| [Vol. %] | | | 9.065 | 14.11 |
| Mass of enamel raw materials/ [g] | — | — | 6 | 6 |

4. Further Embodiments

Further embodiments of the present invention concern:

4.1 Electronically conductive enamel composition comprising or consisting of
- (i) an enamel matrix melting at a temperature in the range 600° C. to 900° C., preferably in the range 600 to 750° C., and
- (ii) particles, embedded in the enamel matrix, of one or more electronically conductive materials, which are not noble metals, wherein the particles (ii) have a particle size of 700 μm or smaller, preferably 300 μm or smaller, more preferably 150 μm or smaller, more preferably still 100 μm or smaller, particularly preferably 38 μm or smaller, and are selected from the group consisting of
  - (a) particles of carbon-based electronically conductive materials,
  - (b) particles of other electronically conductive materials, which are not noble metals,
  - (c) particles made up of a combination of carbon-based electronically conductive materials and other electronically conductive materials, which are not noble metals;

and the total concentration of the particles (ii) is in the range 0.5 wt % to 90 wt %, preferably in the range 1 wt % to 80 wt %, more preferably in the range 10 wt % to 70 wt %, particularly preferably in the range 15 wt % to 60 wt %, with reference to the sum of the masses of the enamel matrix (i) and the particles (ii), wherein the total concentration of particles (a) of carbon-based electronically conductive materials is 40 wt % or less with reference to the sum of the masses of the enamel matrix (i) and the particles (a).

4.2 Enamel composition according to example 4.1 characterised in that the electronically conductive material(s) is (are) selected from the group of metallic electronically conductive materials and/or from the group consisting of graphite, graphite expandate, glassy carbon, carbon black, soot and carbon fibres.

4.3. Enamel composition according to one of examples 4.1 and 4.2, characterised in that the, one, several or all of the electronically conductive material(s) has (have) a melting point in the range 600° C. to 1800° C., preferably in the range 600 to 750° C.

4.4. Enamel composition according to one of examples 4.1 to 4.3, characterised in that the enamel matrix comprises one or more components from the group consisting of boron nitride and ground waste glass.

4.5. Enamel composition according to one of examples 4.1 to 4.4, characterised in that the composition at a voltage of 100 V has an electronic conductivity of $1*10^{-13}$ [S/cm] or more, preferably at a voltage of 100 V an electronic conductivity of $1*10^{-12}$ [S/cm] or more, particularly preferably at a voltage of 100 V an electronic conductivity of $4*10^{-8}$ [S/cm] or more, particularly at a voltage of 40 kV an electronic conductivity of $1*10^{-5}$ [S/cm] or more, more preferably at voltage of 40 kV an electronic conductivity of $1*10^{1}$ [S/cm] or more, particularly preferably at a voltage of 40 kV an electronic conductivity of $1.4*10^{4}$ [S/cm] or more.

4.6. Enamel composition according to one of examples 4.1 to 4.5 comprising
(i) an enamel matrix as defined in example 4.1 or 4.4 and
(ii) particles of one or more stainless steel alloys embedded in this enamel matrix in a concentration of 20 wt % to 60 wt %, preferably 40 wt % to 60 wt %, with reference to the sum of the masses of the enamel matrix and the particles of a stainless steel alloy or
(ii) particles of one or more stainless steel alloys embedded in this enamel matrix and particles of one or more carbon-based electronically conductive materials embedded in this enamel matrix, wherein the total concentration of particles of the stainless steel alloys and the particles of carbon-based electronically conductive materials is 20 wt % to 50 wt %, with reference to the sum of the masses of the enamel matrix, and the mass ratio of the particles of the stainless steel alloys to the particles of carbon-based electronically conductive materials is in the range 1:1 to 10:1, preferably 4:1 to 6:1.

4.7. Coating, more particularly an anti-corrosion coating, comprising or consisting of an enamel composition according to one of examples 4.1 to 4.6

4.8. Coating, more particularly an anti-corrosion coating, according to one of examples 4.1 to 4.7, characterised in that the coating
comprises or consists of an enamel composition according to one of examples 4.1 to 4.6 in a quantity relative to the size of the surface to be coated of 0.01 $g/cm^2$ to 5 $g/cm^2$, and/or
has a thickness of 10 µm to 5000 µm, preferably of 200 µm to 500 µm.

4.9 Article comprising
a base body and
a coating according to one of examples 4.7 and 4.8 disposed on the surface or a portion of the surface of the base body.

4.10 A method for producing an article according to example 4.9 comprising the following steps:
(1) provision of a base body,
(2) provision of a mixture comprising raw materials for formation of an enamel matrix (i) at a firing temperature in the range 600° C. to 900° C., preferably in the range 600 to 750° C., and (ii) particles of one or more electronically conductive materials, which are not noble metals, wherein the particles (ii)
have a particle size of 700 µm or smaller, preferably 300 µm or smaller, more preferably 150 µm or smaller, more preferably still 100 µm or smaller, particularly preferably 38 µm or smaller,
and are selected from the group consisting of
(a) particles of carbon-based electronically conductive materials,
(b) particles of other electronically conductive materials, which are not noble metals,
(c) particles made up of a combination of carbon-based electronically conductive materials and other electronically conductive materials, which are not noble metals;
and the total concentration of the particles (ii) is in the range 0.5 wt % to 90 wt %, preferably in the range 1 wt % to 80 wt %, more preferably in the range 10 wt % to 70 wt %, particularly preferably in the range 15 wt % to 60 wt %, with reference to the sum of the masses of raw materials for formation of an enamel matrix (i) and the particles (ii), wherein the total concentration of particles (a) of carbon-based electronically conductive materials is 40 wt % or less with reference to the sum of the masses of the enamel matrix (i) and the particles (a),
(3) application of the mixture to the surface or a portion of the surface of the base body,
(4) firing of the mixture applied at a temperature in the range 600° C. to 900° C., preferably in the range 600 to 750° C., on the surface or portion of the surface of the base body, to which the mixture has been applied in step (3), so that on the surface or area of the surface of the base body, to which the mixture has been applied in step (3), a coating comprising (i) an enamel matrix and (ii) particles, embedded in the enamel matrix, of one or more electronically conductive materials is formed,
(5) optional repetition of steps (2) to (4), wherein upon repetition of step (3) the mixture is applied to the area of the surface of the base body on which in a previous step (4) a coating has already been formed.

The invention claimed is:

1. Electronically conductive enamel composition comprising
(i) an enamel matrix melting at a temperature in the range 600° C. to 900° C. and
(ii) particles, embedded in the enamel matrix, of one or more electronically conductive materials, which are not noble metals, wherein the particles (ii) have a particle size of 700 µm or smaller and are selected from the group consisting of:
(a) particles of other electronically conductive materials selected from the group comprising metallic electronically conductive materials, which are not noble metals: and
(b) particles made up of a combination of carbon-based electronically conductive materials and other electronically conductive materials selected from the group of metallic electronically conductive materials, which are not noble metals; and the total concentration of the particles (ii) is in the range 9.065 vol % to 67.8 vol %, with reference to the sum of the volumes of the enamel matrix (i) and the particles (ii), wherein an electronic conductance of said enamel composition at a voltage of 100V is at least $4*10^{-8}$ S/cm.

2. Enamel composition according to claim 1, wherein the carbon-based electronically conductive material(s) are selected from the group consisting of graphite, graphite expandate, glassy carbon, carbon black, soot and carbon fibres.

3. Enamel composition according to claim 1, wherein one of, several of, or all of the electronically conductive material(s) has (have) a melting point in the range 600° C. to 1,800° C.

4. Enamel composition according to claim 1, wherein the enamel matrix comprises one or more components from the group consisting of boron nitride and ground waste glass.

5. Enamel composition according to claim 1, wherein
the composition at a voltage of 40 kV has an electronic conductivity of $1*10^{-5}$ [S/cm] or more.

6. Enamel composition according to claim 1, further comprising
(i) particles of one or more stainless steel alloys embedded in the enamel matrix in a concentration of 4.2 vol % to 44.2 vol %, with reference to the sum of the volumes of the enamel matrix (i) and the particles (ii) of one or more stainless steel alloys or
(ii) particles of one or more stainless steel alloys embedded in this enamel matrix and particles of one or more carbon-based electronically conductive materials embedded in this enamel matrix, wherein the total concentration of particles of the stainless steel alloys and the particles of carbon-based electronically conductive materials is 9.065 vol % to 34.5 vol %, with reference to the sum of the volumes of the enamel matrix (i) and the particles (ii), and the ratio of the volume of the particles of the stainless steel alloys to the particles of carbon-based electronically conductive materials is in the range 1:1 to 50:1.

7. Coating, comprising an enamel composition according to claim 1.

8. Coating, according to claim 7, characterised in that the coating
comprising an enamel composition according to claim 1 in a quantity relative to the size of the surface to be coated of 0.01 g/cm² to 5 g/cm², and/or
has a thickness of 10 μm to 5 000 μm, preferably of 200 μm to 500 μm.

9. Article comprising
a base body and
a coating according to claim 7 disposed on the surface or a portion of the surface of the base body.

10. Method for producing an article according to claim 9 comprising:
(1) provision of a base body,
(2) provision of a mixture comprising raw materials for formation of an enamel matrix (i) at a firing temperature in the range 600° C. to 900° C. and (ii) particles, embedded in the enamel matrix, of one or more electronically conductive materials, which are not noble metals, wherein the particles (ii) have a particle size of 700 μm or smaller and are selected from the group consisting of:
(a) particles of other electronically conductive materials selected from the group comprising metallic electronically conductive materials, which are not noble metals: and
(b) particles made up of a combination of carbon-based electronically conductive materials and other electronically conductive materials selected from the group of metallic electronically conductive materials, which are not noble metals; and the total concentration of the particles (ii) is in the range 9.065 vol % to 67.8 vol %, with reference to the sum of the volumes of the enamel matrix (i) and the particles (ii),
(3) application of the mixture to the surface or a portion of the surface of the base body,
(4) firing of the mixture applied at a temperature in the range 600° C. to 900° C. on the surface or portion of the surface of the base body, to which the mixture has been applied in step (3), so that on the surface or portion of the surface of the base body, to which the mixture has been applied in step (3), a coating comprising (i) an enamel matrix and (ii) particles, embedded in the enamel matrix, of one or more electronically conductive materials is formed,
(5) optional repetition of steps (2) to (4), wherein upon repetition of step (3) the mixture is applied to the area of the surface of the base body on which in a previous step (4) a coating has already been formed, wherein an electronic conductance of said enamel composition at a voltage of 100V is at least $4*10^{-8}$ S/cm.

11. Enamel composition according to claim 1, wherein the enamel matrix has a density in the range of 1.5 g/cm³ to 2.9 g/cm³.

12. Enamel composition according to claim 1, wherein the total concentration of the particles (ii) is in the range of 10.5 vol % to 67.8 vol %, with reference to the sum of the volumes of the enamel matrix (i) and the particles (ii).

13. Electronically conductive enamel consisting of the composition of claim 1.

14. Enamel composition of claim 1 wherein said particles (ii) are metallic electronically conductive materials, which are not noble metals.

15. Enamel composition of claim 1 wherein said particles (ii) are a combination of carbon-based electronically conductive materials and other electronically conductive materials selected from the group of metallic electronically conductive materials, which are not noble metals.

* * * * *